United States Patent [19]

Remley

[11] Patent Number: 4,585,827

[45] Date of Patent: Apr. 29, 1986

[54] LOW FORMALDEHYDE RELEASE REACTANT

[75] Inventor: Kenneth H. Remley, Charlotte, N.C.

[73] Assignee: American Cyanamid Company, Stamford, Conn.

[21] Appl. No.: 630,488

[22] Filed: Jul. 13, 1984

[51] Int. Cl.$^4$ .............................................. C08L 61/22
[52] U.S. Cl. ...................................... 524/598; 8/185; 8/186; 524/843; 528/245
[58] Field of Search ................... 528/245; 8/185, 186; 524/598, 843

[56] References Cited

U.S. PATENT DOCUMENTS 4,396,391  8/1983  North .................................... 8/185

*Primary Examiner*—Theodore E. Pertilla
*Attorney, Agent, or Firm*—Gordon L. Hart

[57] ABSTRACT

Textile treating agent for imparting crease resistance is made by mixing 1 mol glyoxal, 2 mols formaldehyde, 1 mol urea and 1.5 mol ethylene glycol and reacting the mixture first at pH 6 to 7 at 60° C. and then at pH 3 at 60°. The product is found to have more stable formaldehyde release properties in textile treating baths as pH of the bath is varied in the range from about 3.0 to about 4.5.

3 Claims, No Drawings ial finishing agents and in making such agents and in
LOW FORMALDEHYDE RELEASE REACTANT The invention relates to improvements in certain textile finishing agents and in making such agents and in their use. More particularly the invention provides an improved method of making textile finishing agents for imparting crease resistance to cotton and cotton-polyester blend fabrics and the like.

The finishing agents of the invention would seem to resemble those described in U.S. Pat. No. 4,396,391 which were prepared by reacting dimethyloldihydroxyethylene urea (DMDHEU) with a polyol. In that patent, DMDHEU was reacted with a polyol such as ethylene glycol at pH 3.0 and fabrics treated with the product were shown to be comparable in wrinkle resistance to those treated with DMDHEU alone or those treated with an unreacted mixture of DMDHEU and the polyol. The reaction of this product in the fabric treatment process was shown to cause lower free formaldehyde release than when the DMDHEU glycol mixture was used for the fabric treatment. The pH of treating solutions that were used for the fabric treatment was not described in the patent.

We found that the textile finishing agents made by reacting DMDHEU with ethylene glycol as described in that patent would release less formaldehyde in the fabric treating process, as the patent had predicted, in treating baths having pH about 3.0 to 3.5, but when the pH of the baths was increased to values above that range the formaldehyde release rate was found to increase rapidly. It was therefore necessary to carefully maintain the treating baths in a very close pH range to maintain the advantage of low formaldehyde release.

A prior art method for making DMDHEU involved the reaction of one mole of urea, one mole of glyoxal and two moles of formaldehyde. Those ingredients were mixed together and reacted at pH about 6.0 and 7.0 for time long enough to complete the reaction, preferably about 3 hours at temperature about 60° C. The reaction product, DMDHEU, could then be reacted with one mole of ethylene glycol at about pH 3 and at reaction temperature, e.g. 60° C., to make the reacton product described in U.S. Pat. No. 4,396,391.

It is an object of the invention to improve the formaldehyde release properties of DMDHEU-glycol reaction products of the kind described, by making those reaction products in a different way.

In a preferred embodiment of the invention, a reaction mixture comprising an aqueous solution of urea, glyoxal, formaldehyde and ethylene glycol is made and the pH is adjusted to about pH 6 to 7 and the mixture is reacted at reaction temperature about 60° C. for about three hours. Then the pH of the mixture is adjusted to about pH 3 and the reaction is continued for about one hour. This second reaction may be carried out at other pH in the range from about 3.5 to 1.0 and for longer reaction times. The reaction temperature may also be varied from about 40° C. to about 80° C. The product mixture is cooled and its pH is adjusted to about 4.5 to 5.5. The product mixture is then ready for use as a textile finishing agent and the product can be diluted with water to the concentration wanted.

The difference between the method of the invention and the prior art method is the addition of glycol before the first reaction is carried out at pH 6 to 7 rather than addition of the glycol after that first reaction has been completed. One might expect to obtain the same reaction product by either method. The products do have the same appearance and both impart about the same crease resistant properties to fabrics. It is found, however, that the products of the invention have significantly different formaldehyde release properties when used instead of the prior art products for textile finishing. In particular, the new products have more stable formaldehyde release properties as pH of the textile treating bath is varied through the range about pH 3 to about pH 4.5. This and other advantages of the invention are illustrated by reference to the following specific examples which include detailed description of the best mode now contemplated for carrying out the invention.

EXAMPLE 1

In a reaction vessel, one mole of glyoxal (40.3% glyoxal, 4.7% formaldehyde aqueous solution) is mixed with two moles of formaldehyde (50% formalin aqueous solution), one mole of urea and 1.5 moles of ethylene glycol. The pH of the mixture is adjusted by addition of NaOH to a value in the range from pH 6 to 7 and is maintained in that range while the mixture is reacted at 60° C. for three hours. Then about 0.5% by weight of citric acid, based on weight of the finished product, is added to the mixture and the pH is adjusted to pH 3.0 by addition of $H_2SO_4$. The temperature of the mixture is maintained at 60° C. for one hour, then cooled to about 25° C. and the pH is finally adjusted to about pH 4.5 to 5.5 by addition of NaOH to make the finished product solution.

EXAMPLE 2

For use as a control, another product is prepared by essentially the same procedure described in Example 1 except the ethylene glycol is omitted from the original mixture but is added at the end of the three hour reaction period, just before the pH is adjusted to pH 3 and the reaction is carried out as before. The product is finished as in Example 1.

EXAMPLE 3

A treating bath is preapred by mixing 10 parts by weight of the finished product solution of Example 1 and one part by weight of a non-ionic surfactant (Deceresol NI conc.) and 2.5 parts by weight of a selected accellerator catalyst solution with water to make 100 parts by weight of the bath solution. Separate bath solutions are made as described, each with one of the following accellerator catalyst solutions having the composition shown:

Catalyst No. 1. 30% MgCl, aqueous solution.

Catalyst No. 2. 15% MgCl+citric acid, aqueous solution.

The pH of the bath solutions before adjustment were in most cases about pH 3.0±0.2. Aliquots from each bath solution were adjusted to pH values from 3.0 to 4.5 at increments of 0.5. Similarly, bath solutions were prepared by the same procedure but using the finished product solution of Example 2. A preferred method for mixing the treating bath solutions is to dilute each ingredient with water before addition.

EXAMPLE 4

Each bath solution described in Example 3 was used to impregnate a sample of 100% cotton broadcloth shirting fabric and another sample of D-C shirting fabric (65-35 cotton-polyester). Each fabric sample was impregnated by immersion using one dip and one nip, with padder pressure of one ton. The dry and cure was carried out by one pass through an oven for 48 seconds at 375° F.

EXAMPLE 5

Each 100% cotton fabric sample, treated as described in Example 4, was tested for wrinkle recovery using the Monsanto wrinkle recovery test. The test results are reported in Table I as the sum of the angles measured in degrees in both the warp and fill directions (W+F).

TABLE I

| | | Wrinkle Recovery (W + F) | | | |
|---|---|---|---|---|---|
| Agent | Catalyst | pH 3.0 | pH 3.5 | pH 4.0 | pH 4.5 |
| Ex. 1 | No. 1 | 234 | 235 | 227 | 235 |
| Ex. 2 | No. 1 | 233 | 239 | 230 | 231 |
| Ex. 1 | No. 2 | 212 | 211 | 203 | 203 |
| Ex. 2 | No. 2 | 220 | 209 | 191 | 197 |

The formaldehyde release was measured by the AATCC Test Method No. 112 for each sample of the D.C. shirting fabric treated as described in Example 4. Results are reported in ppm in Table II.

TABLE II

| | | Formaldehyde Release (ppm) | | | |
|---|---|---|---|---|---|
| Agent | Catalyst | pH 3.0 | pH 3.5 | pH 4.0 | pH 4.5 |
| Ex. 1 | No. 1 | 56 | 56 | 75 | 75 |
| Ex. 2 | No. 1 | 31 | 56 | 125 | 150 |
| Ex. 1 | No. 2 | 62 | 69 | 75 | 75 |
| Ex. 2 | No. 2 | 31 | 37 | 31 | 112 |

The results in Table I above show that the textile finishing composition of the invention was practically equivalent to the prior art materials in imparting wrinkle recovery to the treated textiles.

The comparison of formaldehyde release properties as shown in Table II demonstrates the advantage of far less variation in the amounts of formaldehyde released as pH of the treating baths is changed, when using the DMDHEU glycol reaction product of the invention (Example 1) instead of the prior art textile treating agent (Example 2). The results will vary somewhat depending on the selected catalysts, but with all of the catalysts that have been used with the new DMDHEU-glycol reaction products prepared as described in Example 1, the formaldehyde release property has been far more stable to variations in the pH of the treating bath, than when other closely related DMDHEU-glycol products were used.

In treatments of textiles using the finishing compositions of the invention the formaldehyde release rates for all of the textile treating baths at all of the pH values tested, and with all of the catalysts tested, were within a relatively narrow range. Over the same pH range, the prior art agent caused several fold increase in formaldehyde release as pH was increased. This demonstrates the excellent formaldehyde release properties of the textile finishing agent of the invention. This agent will require less stringent pH control to maintain stable formaldehyde release in the textile treating operations.

We claim:

1. An improved method for making textile finishing agent comprising the steps of
    mixing glyoxal, formaldehyde, urea and a glycol and reacting the mixture at temperature in the range from about 40° C. to about 80° C. and at pH in the range from 6 to 7 for time sufficient to complete the reaction and then
    changing the pH of the product mixture and further reacting at temperature in the range from about 40° C. to about 80° C. and at pH in the range from 3.5 to about 1.0 for time sufficient to complete the reaction and then adjusting the pH of the product mixture to pH in the range from pH 4.5 to 5.5.

2. A textile finishing agent comprising a product made by the process described in claim 1.

3. An aqueous solution of a textile finishing agent defined by claim 2 further comprising a catalyst in said solution for the cross-linking reaction of the product with textile fabric.

* * * * *